United States Patent
Papasakellariou et al.

(10) Patent No.: US 9,288,020 B2
(45) Date of Patent: Mar. 15, 2016

(54) TRANSMISSION OF SOUNDING REFERENCE SIGNALS IN TDD COMMUNICATION SYSTEMS

(75) Inventors: Aris Papasakellariou, Houston, TX (US); Joon Young Cho, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 944 days.

(21) Appl. No.: 12/562,584

(22) Filed: Sep. 18, 2009

(65) Prior Publication Data

US 2010/0074205 A1   Mar. 25, 2010

Related U.S. Application Data

(60) Provisional application No. 61/098,082, filed on Sep. 18, 2008.

(51) Int. Cl.
| | |
|---|---|
| H04W 4/00 | (2009.01) |
| H04L 5/00 | (2006.01) |
| H04L 25/02 | (2006.01) |
| H04L 27/26 | (2006.01) |

(52) U.S. Cl.
CPC ............ *H04L 5/0007* (2013.01); *H04L 5/0048* (2013.01); *H04L 5/0053* (2013.01); *H04L 5/0064* (2013.01); *H04L 25/0226* (2013.01); *H04L 27/2613* (2013.01); *H04L 25/0228* (2013.01)

(58) Field of Classification Search
USPC .......................................................... 370/329
See application file for complete search history.

(56) References Cited

U.S. PATENT DOCUMENTS

| | | |
|---|---|---|
| 8,498,198 B2 | 7/2013 | Kim et al. |
| 2004/0081131 A1 | 4/2004 | Walton et al. |
| 2008/0049708 A1 | 2/2008 | Khan et al. |
| 2008/0080423 A1 | 4/2008 | Kolding et al. |
| 2008/0101306 A1 | 5/2008 | Bertrand et al. |

(Continued)

FOREIGN PATENT DOCUMENTS

| | | |
|---|---|---|
| KR | 1020080073645 | 8/2008 |
| RU | 2 380 845 | 1/2010 |

(Continued)

OTHER PUBLICATIONS

3GPP TSG RAN WG1 Meeting #53bis, Warsaw poland, Jun. 30-Jul. 4, 2008, R1-082329. Motorola, Sounding Maximum Bandwidth for UpPTS, entire document.*

(Continued)

*Primary Examiner* — Maharishi Khirodhar
(74) *Attorney, Agent, or Firm* — The Farrell Law Firm, P.C.

(57) ABSTRACT

A method and apparatus for transmitting and receiving a Sounding Reference Signal (SRS) to a network in a communication system. A bandwidth allocated by the network to transmissions of one or more random access channels is determined. An SRS bandwidth configuration is reconfigured by setting a maximum bandwidth value of the SRS bandwidth configuration to a value that avoids overlapping the bandwidth allocated to transmissions of the one or more random access channels. The SRS is transmitted in accordance with a bandwidth from the reconfigured SRS bandwidth configuration. Information regarding the SRS bandwidth configuration is provided to a User Equipment (UE) by the network.

31 Claims, 15 Drawing Sheets

(56) References Cited

U.S. PATENT DOCUMENTS

2009/0215450 A1\* 8/2009 Baldemaier et al. .......... 455/434
2010/0091708 A1\* 4/2010 Nishikawa ........ H04W 72/0413
　　　　　　　　　　　　　　　　　　　　　　　　370/328

FOREIGN PATENT DOCUMENTS

WO　WO 2008/057899　5/2008
WO　WO 2008/099807　8/2008

OTHER PUBLICATIONS

R1-082754, Way forward on the Maximum SRS Bandwidth for UpPTS, Warsaw, Poland, Jun. 29-Jul. 4, 2008, RAN1#53-Bis.\*
3GPP TSG RAN WG1 Meeting #52bis, Shenzhen, China, Mar. 31-Apr. 4, 2008, document R1-081446, Nokia siemens/Networks, Nokia, SRS bandwidth selection, entire document.\*
Nokia Siemens Networks et al.: "SRS Bandwidth Selection", 3GPP TSG RAN WG1 Meeting #52bis, R1-081446, Mar. 26, 2008.
Motorola: "Sounding Maximum Bandwidth for UpPTS", 3GPP TSG RAN1 #53bis, R1-082329, Jun. 25, 2008.
Catt et al.: "Sounding Maximum Bandwidth for UpPTS", 3GPP TSG RAN1 Meeting #53bis, R1-082755, Jul. 6, 2008.
Panasonic: "Sounding RS Bandwidth Configuration", 3GPP TSG RAN WG1 Meeting #53, R1-081798, May 14, 2008.
Catt et al.: "Remaining Issues on SRS of TDD", 3GPP TSG RAN1 Meeting #55, R1-084279, Nov. 5, 2008.
Catt et al.: "On Sounding Procedure in TDD", 3GPP TSG RAN1 Meeting #54bis, R1-084280, Nov. 5, 2008.
3rd Generation Partnership Project; Technical Specification Group Radio Access Network; Evolved Universal Terrestrial Radio Access (E-UTRA).
Physical Layer Procedures (Release 8), 3GPP Standard; 3GPP TS 36.213 V8.5.0, Dec. 2008.
Nokia, Nokia Siemens Networks, "SRS BW Configuration in UpPTS," R1-083082, 3GPP TSG RAN WG1 Meeting #54, Aug. 22, 2008.
Australian Examination Report dated Feb. 4, 2015 issued in counterpart application No. 2009292820.
Japanese Office Action dated Apr. 6, 2015 issued in counterpart application No. 2014-105915.

\* cited by examiner

TRANSMISSION OF SOUNDING REFERENCE SIGNALS IN TDD COMMUNICATION SYSTEMS

PRIORITY

The present application claims priority under 35 U.S.C. §119(e) to U.S. Provisional Application No. 61/098,082, entitled "Transmission of Sounding Reference Signals in TDD Communication Systems", which was filed on Sep. 18, 2008, the content of which is incorporated herein by reference.

BACKGROUND OF THE INVENTION

1. Field of the Invention

The present invention relates generally to development of the $3^{rd}$ Generation Partnership Project (3GPP) Evolved Universal Terrestrial Radio Access (E-UTRA) Long Term Evolution (LTE), and more particularly, to the transmission of sounding reference signals in Single-Carrier Frequency Division Multiple Access (SC-FDMA) communication systems using Time Division Duplexing (TDD).

2. Description of the Art

In order for a communication system to function properly, several types of signals are supported by the system. In addition to data signals, which convey information content, control signals and Reference Signals (RS) also need to be transmitted to enable proper transmission and reception of data signals. Such signals are transmitted from User Equipments (UEs) to their serving Base Station (BS or Node B) in the UpLink (UL) of the communication system and from the serving Node B to UEs in the DownLink (DL) of the communication system. Examples of control signals include positive or negative acknowledgement signals (ACK or NAK, respectively), transmitted by a UE in response to correct or incorrect data packet reception. Control signals also include Channel Quality Indication (CQI) signals providing information about DL channel conditions that the UE experiences. RSs are typically transmitted by each UE to either provide coherent demodulation for data or control signals at the Node B or to be used by the Node B to measure UL channel conditions that the UE experiences. An RS that is used for demodulation of data or control signals is referred to as a Demodulation (DM) RS, while an RS that is used for sounding the UL channel medium, which is typically wideband in nature, is referred to as a Sounding RS or SRS.

A UE, also commonly referred to as a terminal or a mobile station, may be fixed or mobile and may be a wireless device, a cellular phone, a personal computer device, etc. A Node B (or BS) is generally a fixed station and may also be referred to as a Base Transceiver System (BTS), an access point, or some other terminology.

UEs are assumed to transmit data signals through a Physical Uplink Shared CHannel (PUSCH) while, in the absence of PUSCH transmission, UEs transmit control signals through a Physical Uplink Control CHannel (PUCCH). The data or control signal transmission is over a Transmission Time Interval (TTI) that corresponds to a sub-frame having a duration of 1 millisecond (msec), for example.

FIG. 1 illustrates a block diagram of a sub-frame structure 110 for PUSCH transmission. The sub-frame includes two slots. Each slot 120 includes seven symbols used for the transmission of data signals, RSs, and possibly control signals. Each symbol 130 further includes a Cyclic Prefix (CP) in order to mitigate interference due to channel propagation effects. Signal transmission in different slots may be at the same or a different part of the operating bandwidth. Some symbols in each slot may be used for RS transmission 140 to provide channel estimation and enable coherent demodulation of a received signal. It is also possible for the TTI to have only a single slot or to have more than one sub-frame. The transmission BandWidth (BW) is assumed to include frequency resource units, which are referred to herein as Resource Blocks (RBs). For example, each RB may include $N_{sc}^{RB}=12$ sub-carriers. UEs are allocated one or more consecutive RBs 150 for PUSCH transmission and one RB for PUCCH transmission. The above values are for illustrative purposes only.

In order for a Node B to determine the RBs in which to schedule PUSCH transmission from a UE and the associated Modulation and Coding Scheme (MCS), a CQI estimate of the UL channel medium is required over the PUSCH transmission BW, which is smaller than or equal to the operating BW. Typically, this UL CQI estimate is obtained through the separate transmission of an SRS over the scheduling BW by the UE. This SRS is transmitted in a symbol of an UL sub-frame, replacing the transmission of data or control information. It is used to provide a Signal-to-Interference and Noise Ratio (SINR) estimate over its transmission BW. It can also be used for UL Transmission Power Control (TPC) and UL synchronization.

FIG. 2 shows an SRS transmission. The SRS transmission occurs in a last sub-frame symbol of every other sub-frames 260, 265, for a respective 4.3% SRS overhead. UE1 210 and UE2 220 multiplex their PUSCH transmissions in different parts of the operating BW during a first sub-frame 201, while UE2 220 and UE3 230 do so during a second sub-frame 202, and UE4 240 and UE5 250 do so during a third sub-frame 203. In some symbols of the sub-frame, UEs transmit DM RSs to enable the Node B receiver to perform coherent demodulation of the data or control signal transmitted in the remaining sub-frame symbols. For example, UE1, UE2, UE3, UE4, and UE5 transmit DM RS 215, 225, 235, 245, and 255, respectively. UEs with SRS transmission may or may not have PUSCH transmission in the same sub-frame and, if they co-exist in the same sub-frame, SRS and PUSCH transmission may be located at different parts of the operating BW.

FIG. 3 shows a transmitter structure for the DM RS based on the time-domain transmission of Constant Amplitude Zero Auto-Correlation (CAZAC) sequences. A CAZAC sequence 310 is cyclically shifted in block 320. The Discrete Fourier Transform (DFT) of the resulting sequence is obtained in block 330. The sub-carriers are mapped in block 340 corresponding to the assigned transmission BW of block 350. The Inverse Fast Fourier Transform (IFFT) is performed in block 360. The CP insertion in performed in block 370 and filtering is performed in time windowing block 380, for application to the transmitted signal 390. It is assumed that no padding is inserted by the reference UE in sub-carriers that may be used for signal transmission from other UEs and in guard sub-carriers (not shown). The transmitter structure of FIG. 3 can also be used, possibly with minor modifications (such as the repetition in time of the CAZAC sequence to produce a comb spectrum), for SRS transmission. Moreover, for brevity, additional transmitter circuitry such as a digital-to-analog converter, analog filters, amplifiers, and transmitter antennas, as they are known in the art, are not illustrated.

An alternative generation method for a CAZAC sequence, serving as DM RS or as SRS, is provided in the frequency domain, as illustrated in FIG. 4. With respect to the time-domain generation method of FIG. 3, it is possible that the SRS sub-carriers are not consecutive (SRS has a comb spectrum), which is useful for orthogonally multiplexing (through frequency division) overlapping SRS transmissions with unequal BWs. Such SRS are constructed by CAZAC sequences of different lengths, which cannot be separated using different Cyclic Shifts (CS) as is subsequently discussed. The frequency domain generation of a transmitted CAZAC sequence follows the same steps as the time domain generation with two exceptions. The frequency domain version of the CAZAC sequence is used at block 410. Specifically, the DFT of the CAZAC sequence is pre-computed and not included in the transmission chain. Further, CS block 450 is applied after IFFT block 440. Transmission control bandwidth block 420, sub-carrier mapping block 430, CP insertion block 460, and time windowing block 470 for application to transmitted signal 480, as well as other conventional functionalities (not shown), are the same as FIG. 3.

At the receiver, the inverse (or complementary) transmitter functions are performed. This is illustrated in FIG. 5 and FIG. 6 in which the reverse operations of those in FIG. 3 and FIG. 4 respectively apply.

In FIG. 5, an antenna receives a Radio-Frequency (RF) analog signal and after passing through further processing units (such as filters, amplifiers, frequency down-converters, and analog-to-digital converters) a digital received signal 510 passes through a time windowing unit 520 and the CP is removed in block 530. Subsequently, the receiver unit applies an FFT in block 540, selects sub-carriers used by the transmitter in block 555 through control of reception bandwidth 550, applies an Inverse DFT (IDFT) in block 560, restores the CS applied to the transmitted CAZAC sequence in block 570 and, using a replica of the CAZAC sequence 580, multiplies (correlates) the resulting signal at multiplier 590 to produce an output 595 which can be used for channel or CQI estimation.

Similarly, in FIG. 6, a digital received signal 610 passes through a time windowing unit 620 and the CP is removed in block 630. Subsequently, the CS of the transmitted CAZAC sequence is restored in block 640, an FFT is applied in block 650, the selection of the transmitted sub-carriers is performed in block 665 through control of reception bandwidth 660, and correlation with a CAZAC sequence replica 680 is subsequently applied at a multiplier 670. Finally, output 690 is obtained and can then be passed to a channel estimation unit, such as a time-frequency interpolator, or an UL CQI estimator.

As described above, the RS (DM RS or SRS) is assumed to be constructed from CAZAC sequences. An example of such sequences is given by the following Equation (1):

$$c_k(n) = \exp\left[\frac{j2\pi k}{L}\left(n + n\frac{n+1}{2}\right)\right] \quad (1)$$

where L is a length of the CAZAC sequence, n is an index of an element of the sequence n={0, 1, 2 ..., L−1}, and k is an index of the sequence itself. For CAZAC sequences of prime length L, the number of sequences is L−1. Therefore, an entire family of sequences is defined as k ranges in {1, 2 ..., L−1}. However, the CAZAC sequences for RS transmission need not be generated by strictly using the above expression. As the RBs are assumed to include an even number of sub-carriers, with 1 RB including $N_{sc}^{RB}=12$ sub-carriers, the sequences used for RS transmission can be generated, in the frequency or time domain, by either truncating a longer prime length (such as length 13) CAZAC sequence or by extending a shorter prime length (such as length 11) CAZAC sequence by repeating its first element(s) at the end (cyclic extension).

Alternatively, CAZAC sequences can be generated through a computer search for sequences satisfying the CAZAC properties.

Different CSs of a CAZAC sequence provide orthogonal CAZAC sequences. Therefore, different CSs of a CAZAC sequence can be allocated to different UEs to achieve orthogonal RS multiplexing in the same RBs. This principle is illustrated in FIG. 7. In order for multiple CAZAC sequences 710, 730, 750, and 770, generated respectively from multiple CSs 720, 740, 760, and 780, of the same root CAZAC sequence to be orthogonal, CS value Δ 790 should exceed the channel propagation delay spread D (including a time uncertainty error and filter spillover effects). If $T_S$ is the duration of one symbol, the number of CSs is equal to the mathematical floor of the ratio $T_S/D$. For 12 cyclic shifts and for a symbol duration of about 66 microseconds (14 symbols in a 1 millisecond sub-frame), the time separation of consecutive CSs is about 5.5 microseconds. Alternatively, to provide better protection against multipath propagation, only 6 CSs may be used providing a time separation of about 11 microseconds.

The SRS transmission BW may depend on an SINR that the UE experiences in the UL. For UEs with low UL SINR, the serving Node B may assign a small SRS transmission BW in order to provide a relatively large ratio of transmitted SRS power per BW unit, thereby improving the quality of the UL CQI estimate obtained from the SRS. Conversely, for UEs with high UL SINR, the serving Node B may assign a large SRS transmission BW since accurate UL CQI estimation can be achieved from the SRS while obtaining this estimate over a large BW.

Several combinations for the SRS transmission BW may be supported as shown in Table 1, which corresponds to configurations adopted in 3GPP E-UTRA Release 8. The serving Node B may signal a configuration c through a broadcast channel. For example, 3 bits can indicate one of the eight configurations. The serving Node B may then individually assign to each UE, for example using higher layer signaling of 2 bits, one of the possible SRS transmission BWs $m_{SRS,b}^c$ (in RBs) by indicating the value of b for configuration c. Therefore, the Node B assigns SRS transmission BWs $m_{SRS,0}^c$, $m_{SRS,1}^c$, $m_{SRS,2}^c$, and $m_{SRS,3}^c$ (b=0, b=1, b=2, and b=3, respectively, in Table 1) to UEs having progressively decreasing UL SINRs.

TABLE 1

| Example of $m_{SRS,b}^c$ RB values for UL BW of $N_{RB}^{UL}$ RBs with 80 < $N_{RB}^{UL}$ ≤ 110. | | | | |
|---|---|---|---|---|
| SRS BW configuration | b = 0 | b = 1 | b = 2 | b = 3 |
| c = 0 | 96 | 48 | 24 | 4 |
| c = 1 | 96 | 32 | 16 | 4 |
| c = 2 | 80 | 40 | 20 | 4 |
| c = 3 | 72 | 24 | 12 | 4 |
| c = 4 | 64 | 32 | 16 | 4 |
| c = 5 | 60 | 20 | Not Applicable | 4 |
| c = 6 | 48 | 24 | 12 | 4 |
| c = 7 | 48 | 16 | 8 | 4 |

Variation in the maximum SRS BW is primarily intended to accommodate a varying PUCCH size. The PUCCH is assumed to be transmitted at the two edges of the operating BW and to not be overlapped (interfered) with the SRS. Therefore, the larger the PUCCH size (in RBs), the smaller the maximum SRS transmission BW is.

FIG. 8 further illustrates the concept of multiple SRS transmission BWs for configuration c=3 from Table 1. The PUCCH transmission is located at two edges, 802 and 804, of the operating BW and a UE is configured SRS transmission BWs with either $m_{SRS,0}^3=72$ RBs 812, or $m_{SRS,1}^3=24$ RBs 814, or $m_{SRS,2}^3=12$ RBs 816, or $m_{SRS,3}^3=4$ RBs 818. A few RBs, 806 and 808, may not be sounded, but this usually does not affect the ability of the Node B to schedule PUSCH transmissions in those RBs, since the respective UL SINR may be interpolated from the nearest RBs having SRS transmission. For SRS BWs other than the maximum, the serving Node B is also assumed to assign to a UE a starting frequency position of the SRS transmission.

In communication systems using Time Division Duplexing (TDD), DL and UL transmissions occur in different sub-frames. For example, in a frame having 10 sub-frames, some sub-frames may be used for DL transmission and some may be used for UL transmission.

FIG. 9 shows a half-frame structure for a TDD system. Each 5 ms half-frame 910 is divided into 8 slots 920 which are allocated to normal sub-frames, with structure as described in FIG. 1 for UL transmissions, and special sub-frames. A special sub-frame is constructed through 3 special fields: Downlink ParT Symbols (DwPTS) 930, a Guard Period (GP) 940, and Uplink ParT Symbols (UpPTS) 950. The length of DwPTS+GP+UpPTS is one sub-frame (1 msec) 960. The DwPTS 930 may be used for transmission of synchronization signals from the serving Node B, while the UpPTS 950 may be used for transmission of random access signals from UEs attempting to access the network. The GP 940 facilitates the transition between DL and UL transmissions by absorbing transient interference. DwPTS or UpPTS resources not used for the transmission of synchronization signals or random access signals, respectively, may be used for the transmission of data signals, control signals, or RSs.

Assuming that a random access channel consists of Q RBs then, for a UL operating BW of $N_{RB}^{UL}$ RBs and for $N_{RA}$ random access channels, the maximum SRS transmission BW is $N_{RB}^{UL} - Q \cdot N_{RA}$ RBs. For implementation and testing purposes, it is useful that the SRS and the DM RS employ the same CAZAC sequences. Also, because it is useful to avoid large prime DFT lengths, the PUSCH transmission BW and consequently the DM RS sequence length may be constrained to be a multiple of small prime factors such as for example $2^{\alpha_2} \cdot 3^{\alpha_3} \cdot 5^{\alpha_5}$ RBs, where $\alpha_2$, $\alpha_3$, and $\alpha_5$ are non-negative integers. Moreover, if the SRS transmission BW is configured to be a multiple of 4 RBs, as in Table 1, the SRS transmission BW is $2^{(2+\alpha_2)} \cdot 3^{\alpha_3} \cdot 5^{\alpha_5}$ RBs.

Since no PUCCH transmission is assumed in UpPTS symbols, the conventional approach is for a maximum SRS transmission BW $N_{max}^{SRS}$ to be $N_{max}^{SRS} = 2^{(2+\alpha_2)} \cdot 3^{\alpha_3} \cdot 5^{\alpha_5} \leq (N_{RB}^{UL} - Q \cdot N_{RA})$ RBs. This assumes that $N_{RA}$ random access channels, each comprising of Q RBs, are placed at the two edges of the operating BW, for example, in a similar manner as that for the PUCCH in FIG. 8. For SRS transmission BWs smaller than the maximum, the same values may be maintained regardless of whether the transmission symbol is a UpPTS transmission symbol.

However, the above approach may introduce additional SRS BWs in UpPTS symbols beyond the ones supported in non-UpPTS symbols. For example, for $N_{RB}^{UL}=100$ and $N_{RA}=2$, the maximum SRS transmission BW in UpPTS symbols becomes 88 RBs, which is not supported by any configuration in Table 1. Consequently, the number of options for the maximum SRS transmission BW is increased and additional testing is required.

Additionally, the above-described approach does not address situations in which the maximum SRS BW in a UpPTS symbol is smaller than the maximum SRS BW in non-UpPTS symbols.

Additionally, the above-described approach assumes that the random access channels are placed at either one or both of the operating BW edges in a predetermined manner. However, it may be preferable, from an overall system operation standpoint, for a Node B to configure the BW position of random access channels (for example, through broadcast signaling). In such cases, the SRS assignment and the UE behavior regarding SRS transmission should be such that no interference is caused to the transmission of random access signals.

SUMMARY OF THE INVENTION

The present invention has been made to address at least the above problems and/or disadvantages and to provide at least the advantages described below. Accordingly, an aspect of the present invention provides methods and apparatus for enabling the adjustment of the transmission bandwidth of Sounding Reference Signals (SRS) within a set of predetermined SRS transmission bandwidths to provide means for extending the availability of channel quality estimates over an operating bandwidth while enabling the proper functionality of SRS and random access signaling.

According to an aspect of the present invention, a method is provided for a User Equipment to transmit a Sounding Reference Signal (SRS) to a network in a communication system. A bandwidth allocated by the network to transmissions of one or more random access channels is determined. An SRS bandwidth configuration is reconfigured by setting a maximum bandwidth value of the SRS bandwidth configuration to a value that avoids overlapping the bandwidth allocated to transmissions of the one or more random access channels. The SRS is transmitted in accordance with a bandwidth from the reconfigured SRS bandwidth configuration. Information regarding the SRS bandwidth configuration is provided to a User Equipment (UE) by the network.

According to another aspect of the present invention, a User Equipment (UE) is provided for transmitting a Sounding Reference Signal (SRS) to a network in a communication system. The UE includes a sub-carrier mapper for determining a bandwidth allocated by a network to transmissions of one or more random access channels, reconfiguring an SRS bandwidth configuration by setting a maximum bandwidth value of the SRS bandwidth configuration to a value that avoids overlapping the bandwidth allocated to transmissions of the one or more random access channels, and transmitting the SRS in accordance with a bandwidth from the reconfigured SRS bandwidth configuration. Information regarding the SRS bandwidth configuration is provided to the UE by the network.

According to a further aspect of the present invention, a method is provided for a network to receive a Sounding Reference Signal (SRS) from a User Equipment (UE) in a communication system. A bandwidth is allocated to transmissions of one or more random access channels. The allocated bandwidth and an SRS bandwidth configuration are transmitted to the UE. An SRS transmission is received in accordance with a bandwidth from a reconfigured SRS bandwidth configuration, which was reconfigured by the UE by setting a maximum bandwidth value of the SRS bandwidth configuration to a value that avoids overlapping the bandwidth allocated to transmissions of the one or more random access channels.

According to an additional aspect of the present invention a network is provided for receiving a Sounding Reference Signal (SRS) from a User Equipment (UE) in a communication system. The network includes a sub-carrier mapper for allocating a bandwidth to transmissions of one or more random access channels. The network also includes a transmitter for transmitting the allocated bandwidth and an SRS bandwidth configuration to the UE. The network further includes a receiver for receiving an SRS transmission in accordance with a bandwidth from a reconfigured SRS bandwidth configuration, which was reconfigured by the UE by setting a maximum bandwidth value of the SRS bandwidth configuration to a value that avoids overlapping the bandwidth allocated to transmissions of the one or more random access channels.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
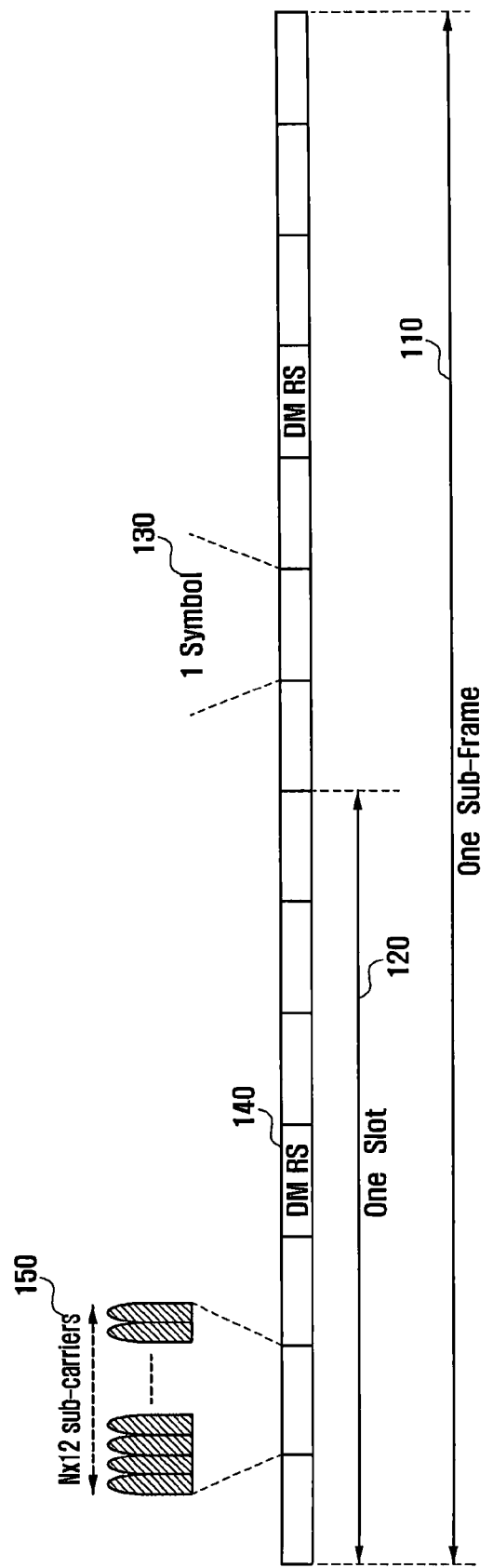
FIG. 1 is a diagram illustrating a UL sub-frame structure for PUSCH transmission.
Figure 2:
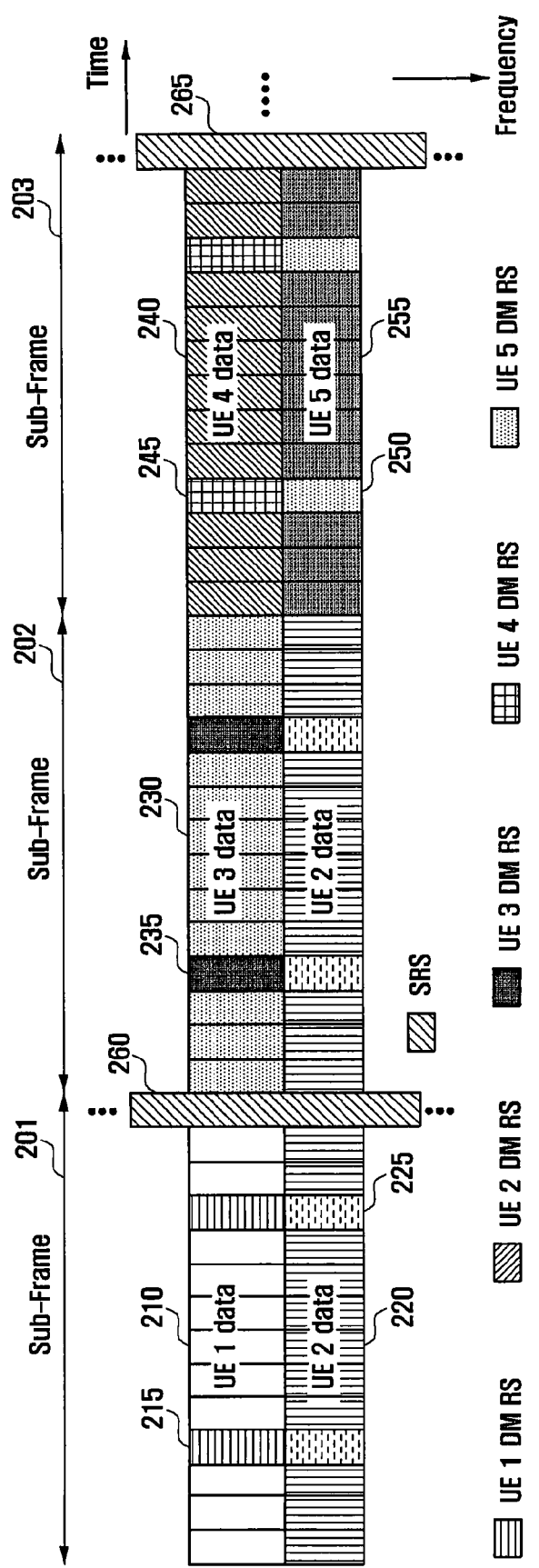
FIG. 2 is a diagram illustrating multiplexing of SRS transmissions from several UEs.
Figure 3:
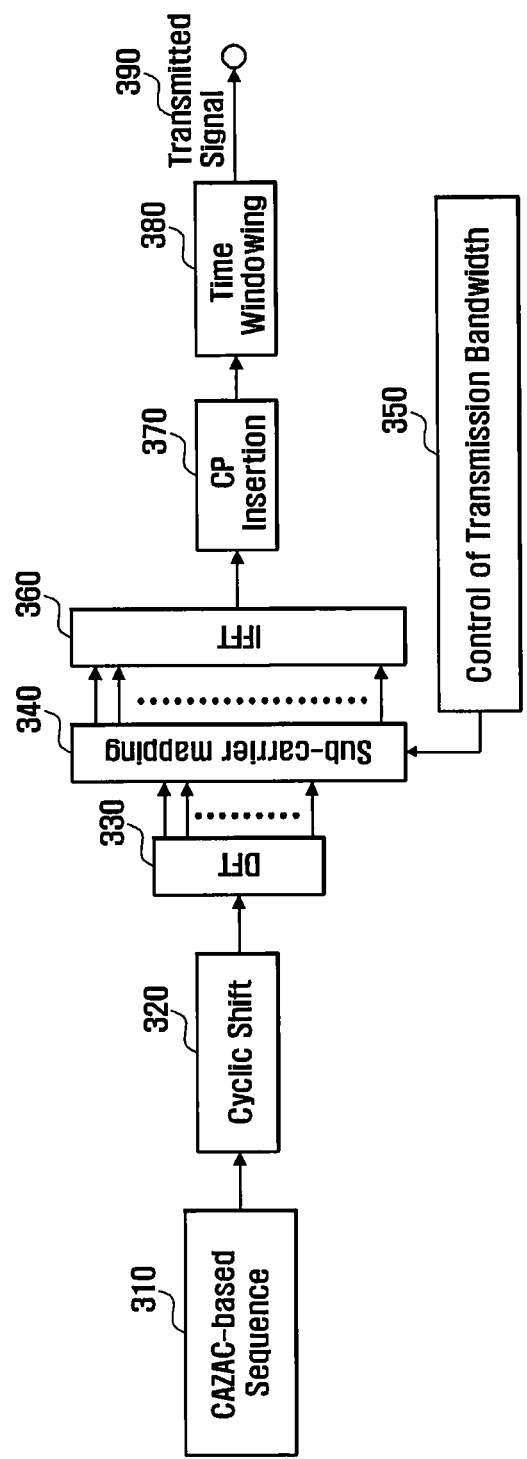
FIG. 3 is a block diagram illustrative of a first SC-FDMA transmitter for CAZAC sequences.
Figure 4:
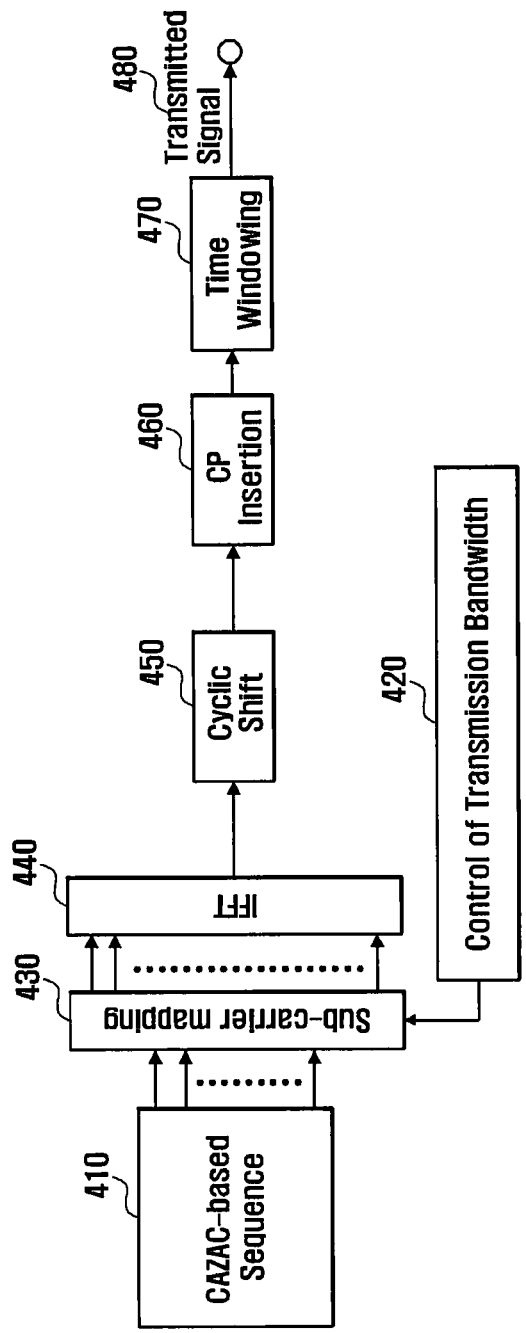
FIG. 4 is a block diagram illustrative of a second SC-FDMA transmitter for CAZAC sequences.
Figure 5:
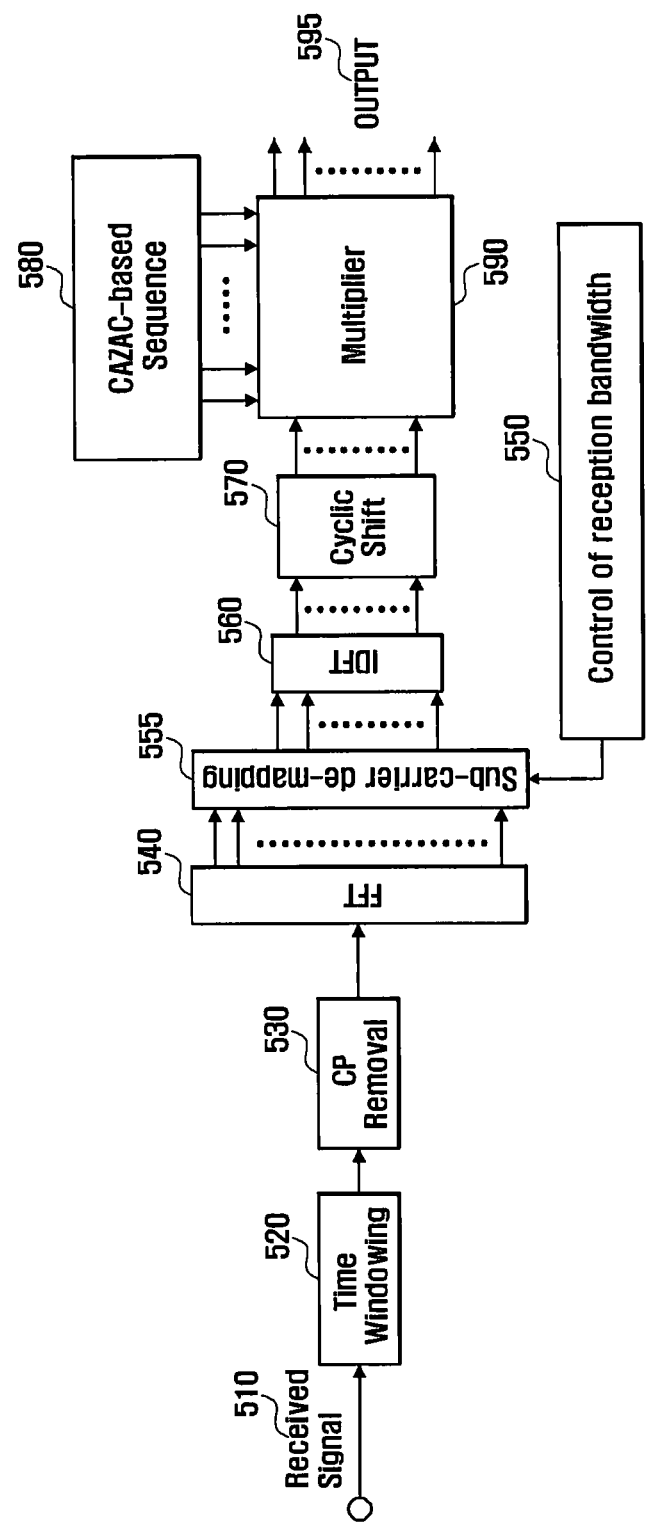
FIG. 5 is a block diagram illustrative of a first SC-FDMA receiver for CAZAC sequences.
Figure 6:
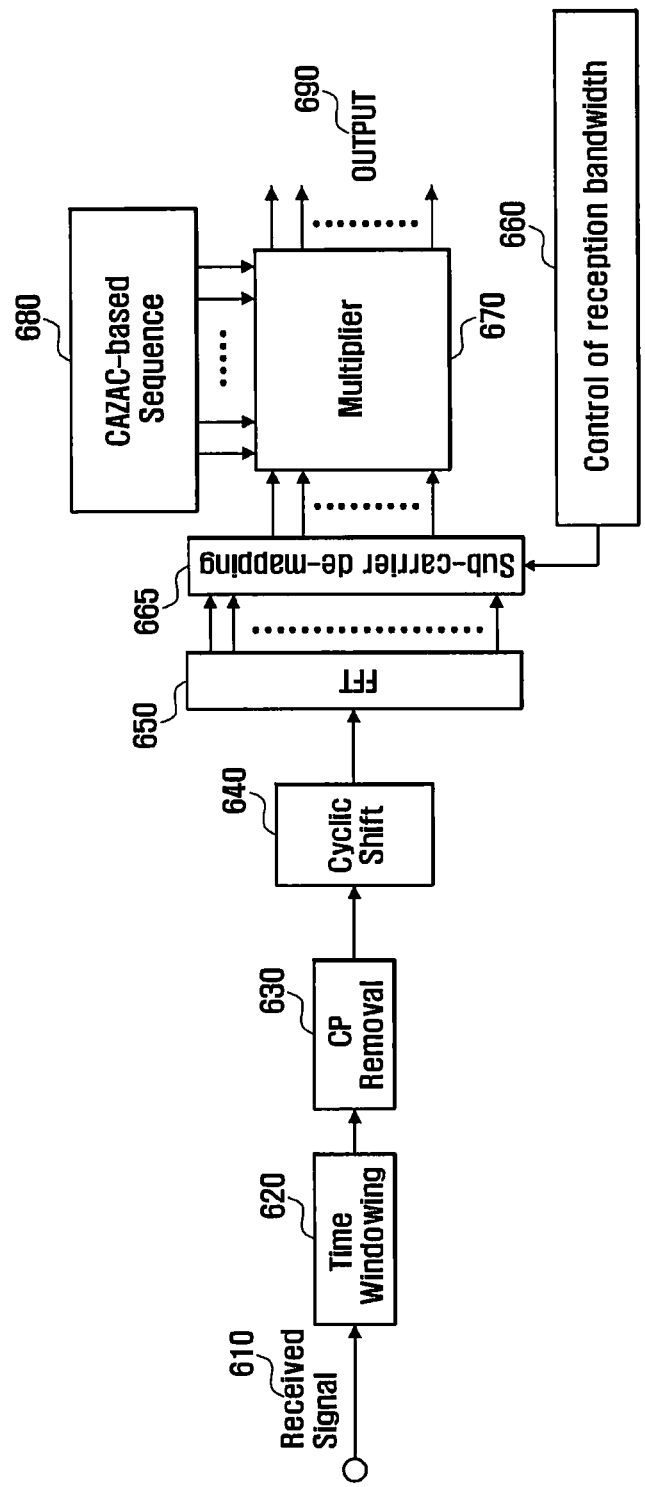
FIG. 6 is a block diagram illustrative of a second SC-FDMA receiver for CAZAC sequences.
Figure 7:
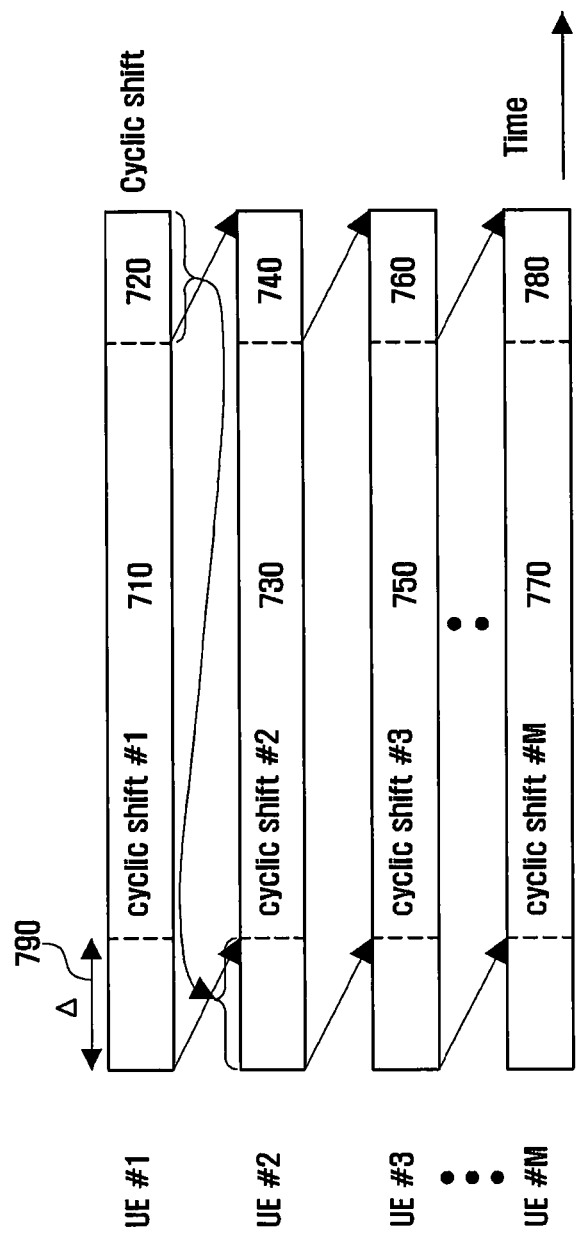
FIG. 7 is a diagram illustrative of applying cyclic shifts to a CAZAC sequence.

Embodiments of the present invention are described in detail with reference to the accompanying drawings. The same or similar components may be designated by the same or similar reference numerals although they are illustrated in different drawings. This invention may, however, be embodied in many different forms and should not be construed as limited to the embodiments set forth herein. Rather, these embodiments are provided so that this disclosure will be thorough and complete and will fully convey the scope of the invention to those skilled in the art. Detailed descriptions of constructions or processes known in the art may be omitted to avoid obscuring the subject matter of the present invention.

Additionally, although embodiments of the present invention are described in relation to an SC-FDMA communication system, the present invention may also apply to all Frequency Division Multiplexing (FDM) systems in general and to Orthogonal Frequency Division Multiple Access (OFDMA), Orthogonal Frequency Division Multiplexing (OFDM), Frequency Division Multiple Access (FDMA), Discrete Fourier Transform (DFT)-spread OFDM, DFT-spread OFDMA, Single-Carrier OFDMA (SC-OFDMA), and Single-Carrier OFDM (SC-OFDM) in particular.

The objects of embodiments of the present invention consider the support of SRS transmissions in the presence of random access channels in a UpPTS symbol of a TDD communication system.

A first object considers a method for determining the maximum SRS transmission BW, while avoiding introducing SRS transmission BWs that are not supported in non-UpPTS symbols and avoiding overlapping between the maximum SRS transmission BW and the BW allocated to random access channels.

A second object considers methods for adjusting the SRS transmission BWs when they would otherwise at least partly overlap with the BW allocated to random access channels and to avoid such overlapping.

A third object considers methods for adjusting the SRS transmission BW when the frequency location of random access channels can be configurable in the operating BW as specified by the serving Node B.

A total of $N_{RA}$ random access channels, each having Q RBs, are assumed to be placed at one or both of the operating BW edges in a predetermined manner. Furthermore, the SRS BW configurations for a given operating BW of $N_{RB}^{UL}$ RBs are assumed to be predetermined, such as, for example, those listed in Table 1.

In order to avoid introducing new SRS transmission BWs beyond the predetermined ones, having Table 1 as reference for the notation, embodiments of the present invention consider that the maximum SRS BW in UpPTS symbols is determined according to the following Equation (2):

$$N_{max}^{SRS} = \max_{c \in C} \{m_{SRS,0}^c\} \leq (N_{RB}^{UL} - Q \cdot N_{RA}) \quad (2)$$

where the evaluation is over the entire set C of SRS BW configurations (for example, the eight configurations in Table 1). Therefore, the maximum of the maximum SRS transmission BWs across all supportable configurations that is smaller than or equal to $(N_{RB}^{UL} - Q \cdot N_{RA})$ is selected as the maximum SRS transmission BW in UpPTS symbols. The remaining SRS transmission BWs, other than the maximum one, are the same as that in non-UpPTS symbols.

The determination of the maximum SRS transmission BW as in Equation (2) allows its increase when the BW of the random access channels in a UpPTS symbol is smaller than the PUCCH BW in normal sub-frames, thereby enabling the sounding of a larger BW in the UpPTS symbol. The determination of the maximum SRS transmission BW as in Equation (2) also allows its reduction when the BW of the random access channels in a UpPTS symbol is larger than the PUCCH BW in normal sub-frames. This adjustment allows for the avoidance of overlapping between SRS transmissions with maximum BW and the transmission of random access channels in the UpPTS symbol.

The first RB for the SRS transmission with maximum BW is determined according to the following Equation (3):

$$k_0 = \lfloor (N_{RB}^{UL} - N_{max}^{SRS})/2 \rfloor + 1 \quad (3)$$

where the "floor" operation $\lfloor \ \rfloor$ rounds a number to its previous integer. In terms of sub-carriers, this is equivalent to $k_0 = \lfloor (N_{RB}^{UL} - N_{max}^{SRS})/2 \rfloor N_{sc}^{RB} + 1$ since 1 RB corresponds to $N_{sc}^{RB}$ sub-carriers. Further, assuming a comb spectrum for the SRS with a total of $K_0$ combs, the first sub-carrier of the maximum BW SRS transmission in the UpPTS symbol may be determined as $k_0 = k'_0 + \lfloor (N_{RB}^{UL} - N_{max}^{SRS})/2 \rfloor N_{sc}^{RB} + 1$ where $k'_0 \in \{0, \ldots, K_0-1\}$ defines the comb and is assumed to be assigned to a UE by the serving Node B through higher layer signaling. It should be noted that although embodiments of the present invention consider the above starting position for the starting RB (or sub-carrier) of the maximum BW SRS transmission, this is an independent aspect which is not directly related to the remaining aspects of the present invention.

Denoting the SRS BW configuration signaled by the serving Node B (for example, through a broadcast channel) as $c_S$ and the SRS BW configuration from which the maximum SRS transmission BW is selected in UpPTS symbols as $c_U$, then S≠U either when $$m_{SRS,0}^S > N_{RB}^{UL} - Q \cdot N_{RA} \text{ and } m_{SRS,0}^U \leq N_{RB}^{UL} - Q \cdot N_{RA}$$

or when $$m_{SRS,0}^S < m_{SRS,0}^U \leq N_{RB}^{UL} - Q \cdot N_{RA}.$$

Figure 8:
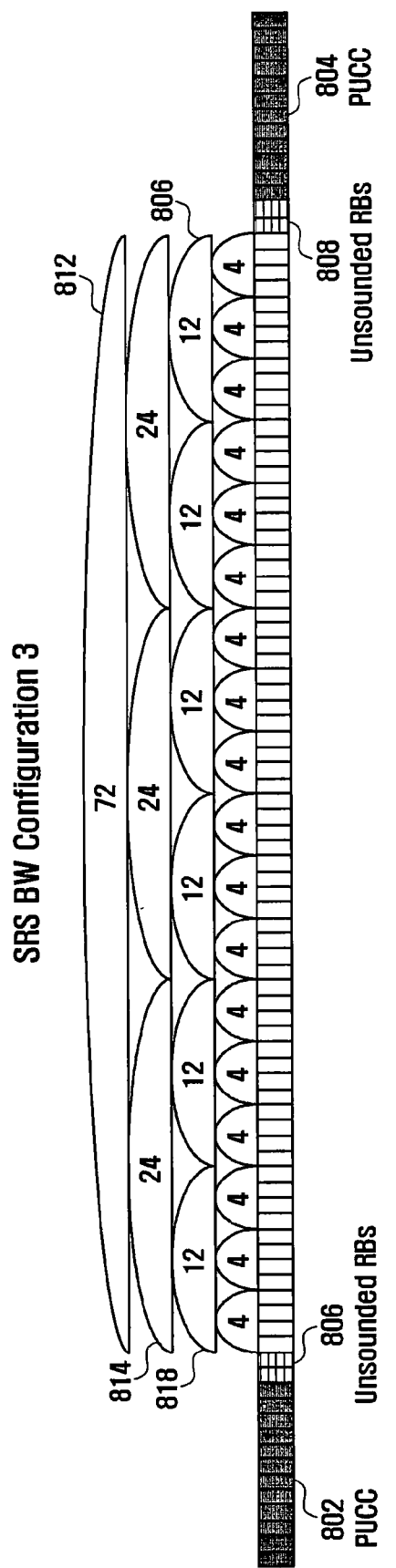
FIG. 8 is a diagram illustrating SRS transmission BWs in a normal sub-frame.
Figure 9:
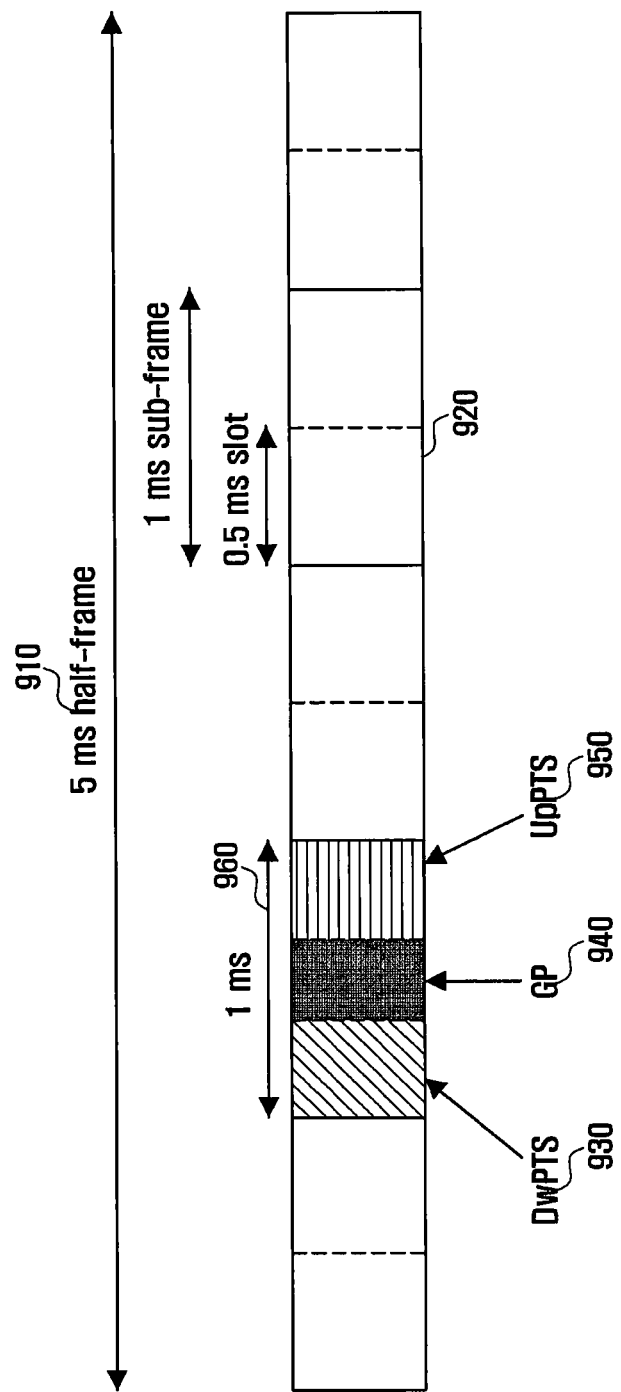
FIG. 9 is a diagram illustrating the special sub-frame structure.
Figure 10:
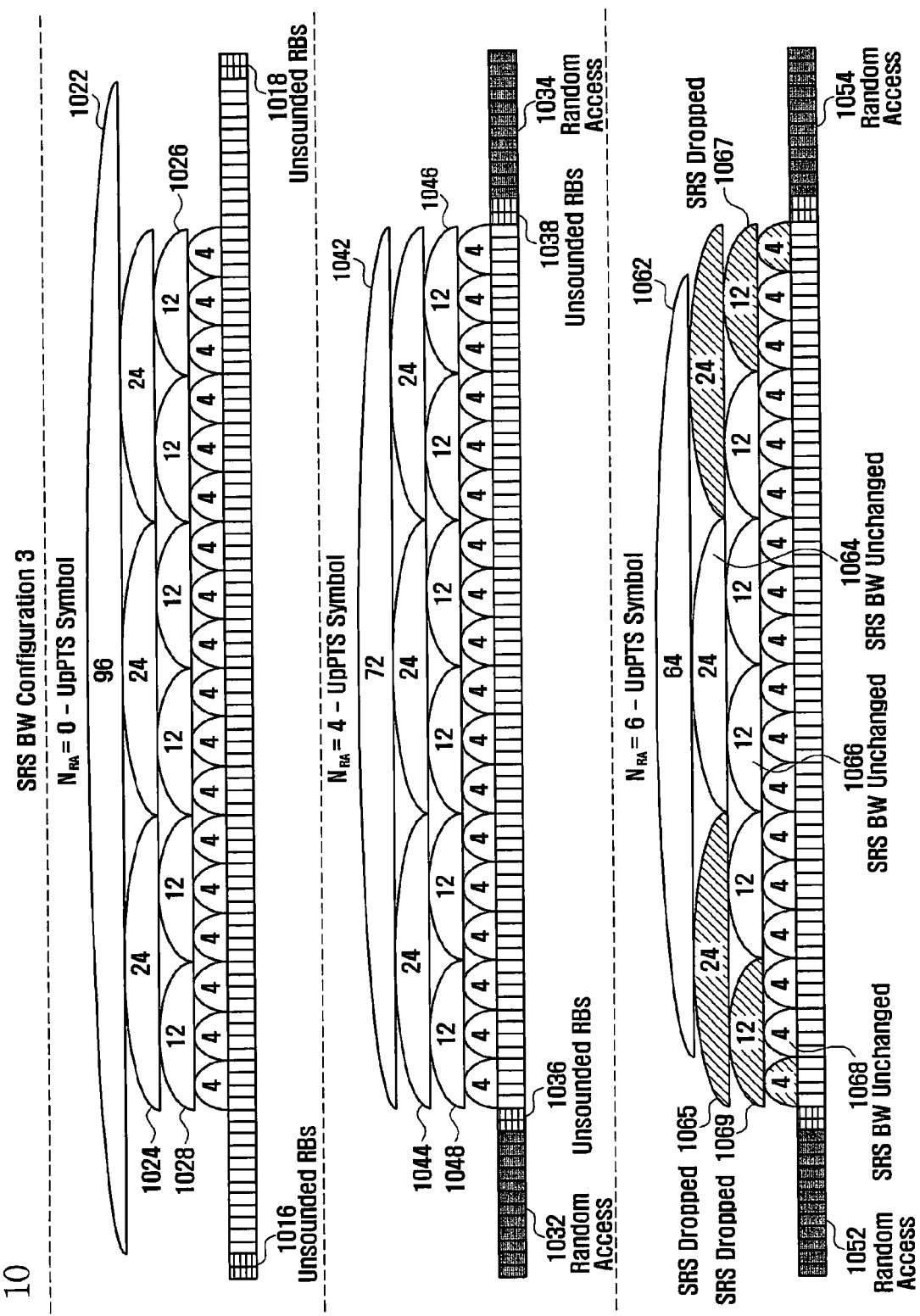
FIG. 10 is a diagram illustrating adjustment of a maximum SRS transmission bandwidth in a UpPTS symbol for various bandwidths of random access channels, according to an embodiment of the present invention.

For example, referring to Table 1 and assuming Q=6, $N_{RB}^{UL}$=100, and that configuration c=3 is broadcasted by the serving Node B for use in non-UpPTS symbols, then:

if $N_{RA}$=0 in a UpPTS symbol, the maximum SRS transmission BW $N_{max}^{SRS}$ of 96 RBs (for c=0 or c=1) applies even though the maximum SRS transmission BW $m_{SRS,0}^3$ in non-UpPTS symbols is 72 RBs and $(N_{RB}^{UL} - Q \cdot N_{RA})$ is 100 RBs if $N_{RA}$=4 in a UpPTS symbol, the same maximum SRS transmission BW $N_{max}^{SRS}$ of 72 RBs, as $m_{SRS,0}^3$ in non-UpPTS symbols, applies even though $(N_{RB}^{UL} - Q \cdot N_{RA})$ is 76 RBs if $N_{RA}$=6 in a UpPTS symbol, the maximum SRS transmission BW $N_{max}^{SRS}$ of 64 RBs (c=4) applies even though the maximum SRS transmission BW in non-UpPTS symbols $m_{SRS,0}^3$ is 72 RBs–$(N_{RB}^{UL} - Q \cdot N_{RA})$ is also 64 RBs FIG. 10 further illustrates the above example, according to an embodiment of the present invention, assuming the SRS BW configuration c=3 from Table 1 in non-UpPTS symbols (the numbers correspond to RBs). If $N_{RA}$=0 in a UpPTS symbol, a few RBs at each edge of the operating BW, 1016 and 1018, remain unsounded, as in FIG. 8, but a maximum SRS transmission BW $N_{max}^{SRS}$ 1022 becomes 96 RBs. The remaining SRS transmission BWs, $m_{SRS,1}^3$=24 RBs 1024, $m_{SRS,2}^3$=12 RBs 1026, or $m_{SRS,3}^3$=4 RBs 1028 remain the same as in non-UpPTS symbols. If $N_{RA}$=4 in a UpPTS symbol, random access channels, 1032 and 1034, are assumed to be located (evenly split in case $N_{RA}$ is an even integer) at each edge of the operating BW. A few RBs at each edge of the operating BW, 1036 and 1038, remain unsounded, and a maximum SRS transmission BW $N_{max}^{SRS}$ 1042 is the same as $m_{SRS,0}^3$ in non-UpPTS symbols and equals 72 RBs. The remaining SRS transmission BWs $m_{SRS,1}^3$=24 1044, $m_{SRS,2}^3$=12 1046, and $m_{SRS,3}^3$=4 RBs 1048 again remain the same as in non-UpPTS symbols. Finally, if $N_{RA}$=6 in a UpPTS symbol, random access channels, 1052 and 1054, are again assumed to be located at each edge of the operating BW. All RBs not allocated to random access channels are sounded, and a maximum SRS transmission BW $N_{max}^{SRS}$ 1062 is 64 RBs. The most noteworthy aspect of $N_{RA}$=6 is that the random access channels also occupy a part of the BW where SRS with BW smaller than the maximum is transmitted in non-UpPTS symbols. The embodiment of the present invention illustrated in FIG. 10 assumes that such SRS transmissions 1065, 1067, and 1069, are suspended (dropped) while the remaining ones, 1064, 1066, and 1068, occur as in non-UpPTS symbols. However, alternative approaches that reduce or avoid dropped SRS transmissions can be applied as subsequently described.

Figure 11:
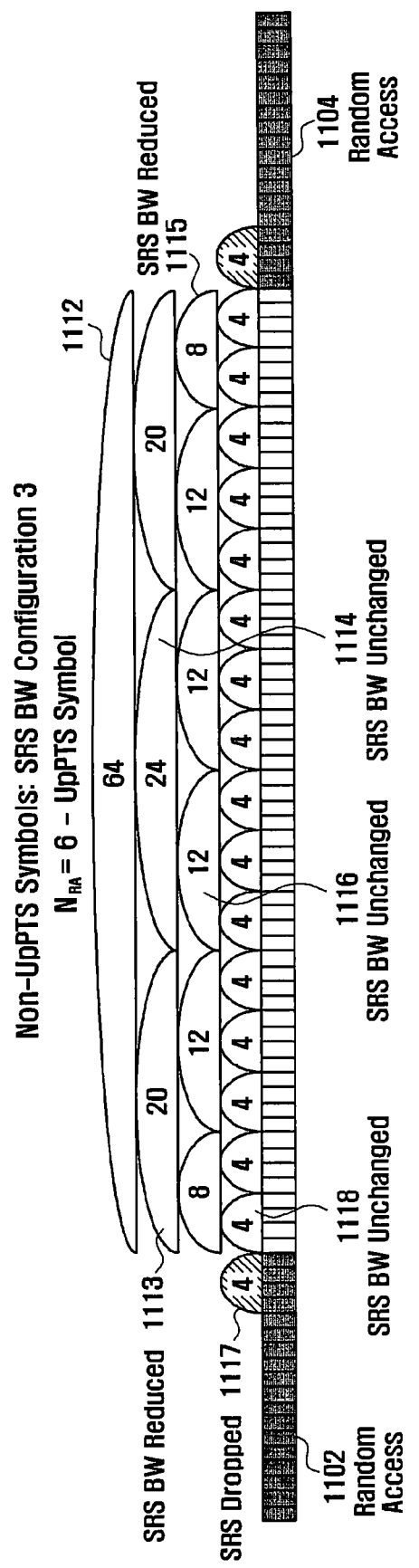
FIG. 11 is a diagram illustrating a first adjustment of intermediate SRS transmission bandwidths that are adjacent to and overlap with a transmission bandwidth of random access channels located at edges of an operating bandwidth in a UpPTS symbol, according to an embodiment of the present invention.

Embodiments of the present invention consider that for intermediate SRS BWs (other than the maximum or minimum ones), instead of dropping the SRS transmissions in BWs overlapping with the BWs allocated to the random access channels, the transmission BW of these SRS is instead reduced to the maximum BW that is supported in non-UpPTS symbols and does not extend to the BW allocated to the random access channels. Using the case of $N_{RA}$=6 in the previous example, FIG. 11 further illustrates the above principle, according to an embodiment of the present invention. Random access channels, 1102 and 1104, are again located at the two edges of the operating BW. A maximum SRS transmission BW $N_{max}^{SRS}$ 1112 is again 64 RBs. SRS transmissions with the minimum BW overlapping with the BW allocated to the random access channels 1117 are dropped. However, SRS transmissions with intermediate BWs overlapping with the BW allocated to the random access channels are not dropped but are instead reduced in BW from 24 RBs to 20 RBs, 1113, and from 12 RBs to 8 RBs, 1115, since 20 RBs and 8 RBs, respectively, are the maximum SRS BWs supported in non-UpPTS symbols (Table 1) that does not cause the SRS transmission BW to overlap with the BW allocated to the random access channels. The other SRS transmissions for the intermediate BWs, 1114, 1116, and 1118, are not affected.

In general, in order to also address the scenario that $(N_{RB}^{UL} - Q \cdot N_{RA})$ is smaller than the minimum of the maximum SRS transmission BWs, which in the example of Table 1 is equal to 48 RBs and obtained for c=6 or c=7, the maximization operation in Equation (2) may be extended over all SRS transmission BWs for all configurations according to Equation (4):

$$N_{max}^{SRS} = \max_{\substack{b \in B \\ c \in C}} \{m_{SRS,b}^c\} \leq (N_{RB}^{UL} - Q \cdot N_{RA}) \quad (4)$$

where the evaluation is over the entire set B of SRS transmission BWs for a given SRS BW configuration and over the entire set C of SRS BW configurations.

Figure 12:
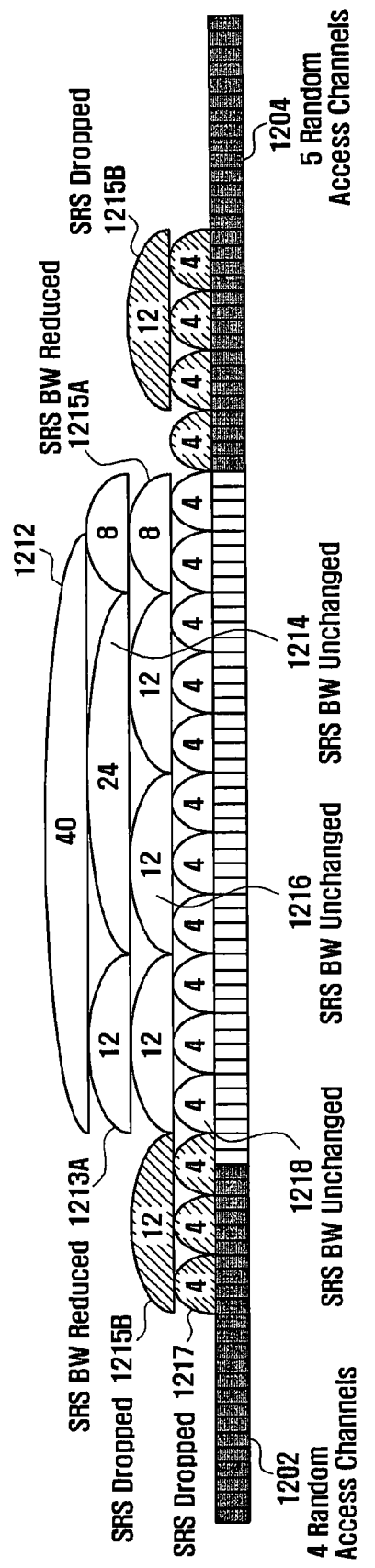
FIG. 12 is a diagram illustrating a second adjustment of intermediate SRS transmission bandwidths that are adjacent to and overlap with the transmission bandwidth of random access channels located at the edges of the operating bandwidth in a UpPTS symbol, according to an embodiment of the present invention.

For example, using the same parameter values as assumed above, if $N_{RA}=9$ in a UpPTS symbol, $(N_{RB}^{UL}-Q \cdot N_{RA})=46$ while none of the maximum SRS transmission BWs in the configurations of Table 1 is smaller than 46. Then, the maximum SRS transmission BW in the UpPTS symbol is 40 RBs which is obtained for b=1, c=2. All UEs assigned SRS transmission BWs larger than 40 RBs in non-UpPTS symbols may revert to the maximum supportable BW smaller than 40 RBs in non-UpPTS symbols although this BW may not be the maximum one in non-UpPTS symbols. FIG. 12 further illustrates the previous principle, according to an embodiment of the present invention. Random access channels, 1202 and 1204, are again located at the two edges of the operating BW. A maximum SRS transmission BW $N_{max}^{SRS}$ 1212 is reduced to 40 RBs, and SRS transmissions with the minimum BW overlapping with the BW allocated to the random access channels 1217 are dropped. As in FIG. 11, SRS transmissions with intermediate BWs overlapping with the BW allocated to the random access channels are not dropped but are instead reduced in BW 1213A, 1215A, or dropped 1215B. The other SRS transmissions for the intermediate BWs, 1214, 1216, and 1218 are not affected.

Figure 13:
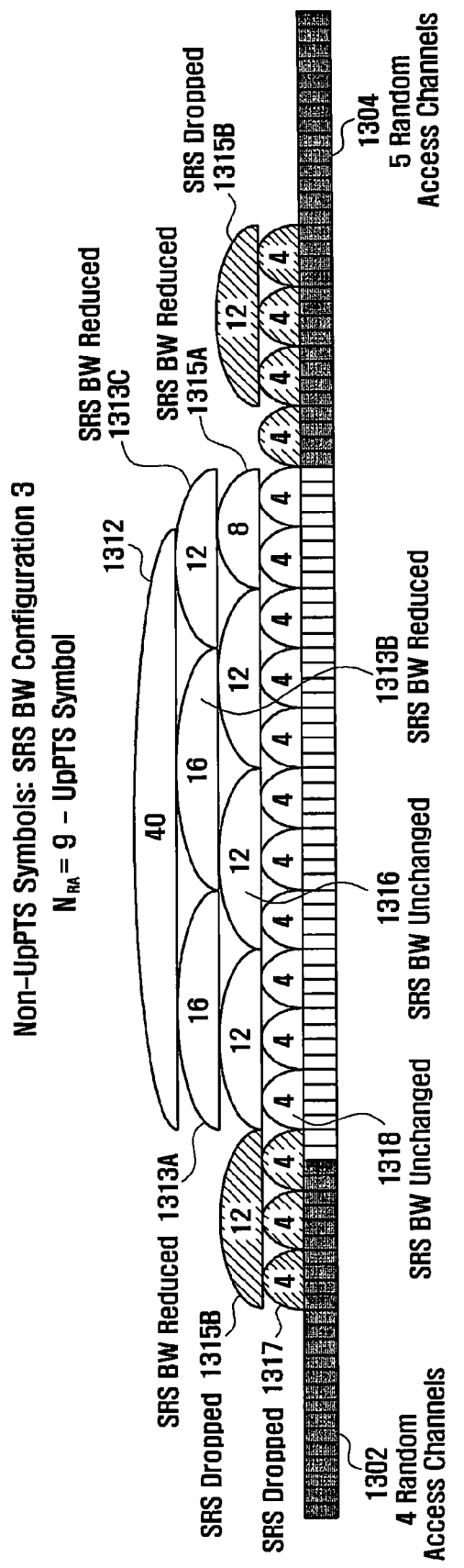
FIG. 13 is a diagram illustrating a third adjustment of intermediate SRS transmission bandwidths to avoid overlapping with the transmission bandwidth of random access channels located at the edges of the operating bandwidth in a UpPTS symbol, according to an embodiment of the present invention.

An alternative approach is illustrated in FIG. 13, according to an embodiment of the present invention. The same arguments as for FIG. 12 apply with the only difference being that the BW reduction may apply for all SRS positions of the intermediate SRS BWs and not only for those located next to the random access channels. This can be achieved by calculating the number of RBs available for SRS transmission as $(N_{RB}^{UL}-Q \cdot N_{RA})$ and dividing them over the number of SRS positions so that BWs supportable in non-UpPTS symbols are obtained. For SRS BW configuration c=3 and the second largest SRS BW in non-UpPTS symbols, there are 3 SRS positions (Table 1). In FIG. 13, the $(N_{RB}^{UL}-Q \cdot N_{RA})=44$ RBs can be divided among the 3 SRS positions as 16 RBs, 16 RBs, and 12 RBs in 1313A, 1313B, and 1313C, respectively. Elements 1302, 1304, 1312, 1315A, 1315B, 1316, 1317 and 1318 of FIG. 13 correspond directly to elements 1202, 1204, 1212, 1215A, 1215B, 1216, 1217 and 1218 of FIG. 12, respectively.

Unlike the PUCCH, when the frequency position of the random access channels is not always at the two edges of the operating BW, the setup for the SRS transmission in a UpPTS symbol becomes different than the one in non-UpPTS symbols. The SRS transmission BW may always overlap with the BW allocated to the random access channels. In such cases, similar principles to the ones described using FIG. 10 through FIG. 13 can be applied.

Figure 14:
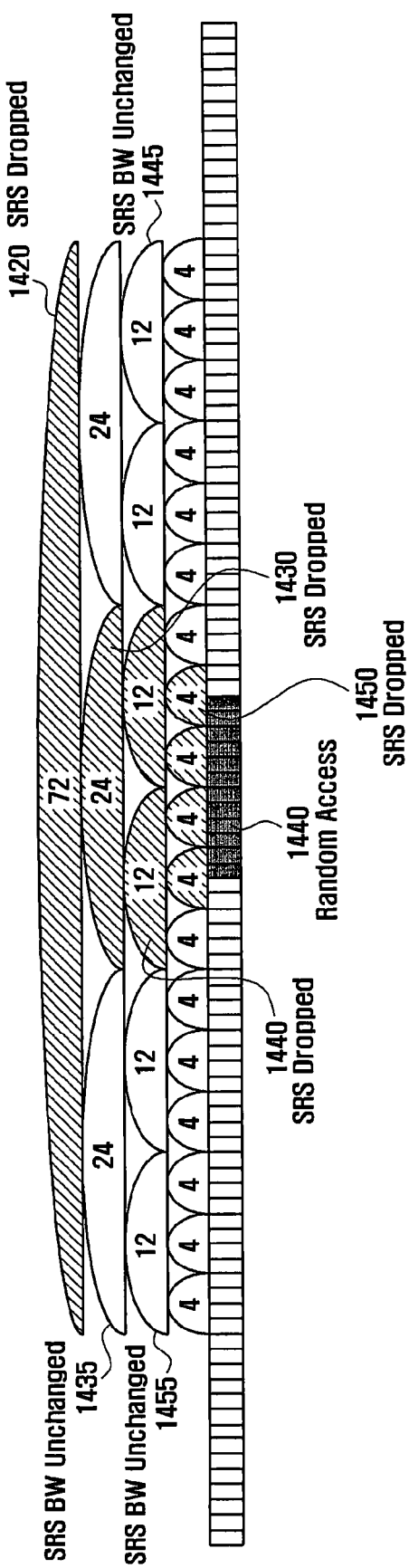
FIG. 14 is a diagram illustrating a first adjustment of intermediate SRS transmission bandwidths to avoid overlapping with the transmission bandwidth of random access channels located in an interior of the operating bandwidth in a UpPTS symbol, according to an embodiment of the present invention.

A first approach is to drop (suspend) the SRS transmission in BWs overlapping with the BW allocated to the random access channels. This is illustrated in FIG. 14, according to an embodiment of the present invention. BW allocated to random access channels 1410 is placed near the middle of the operating BW but any other location may apply. SRS transmission with the maximum BW 1420 is dropped as it overlaps with the BW allocated to the random access channels. The same applies for respective SRS transmissions with smaller BWs in 1430, 1440 and 1450. Conversely, SRS transmissions in BWs not overlapping with the BW allocated to the random access channels, 1435, 1445 and 1455, remain unchanged.

Figure 15:
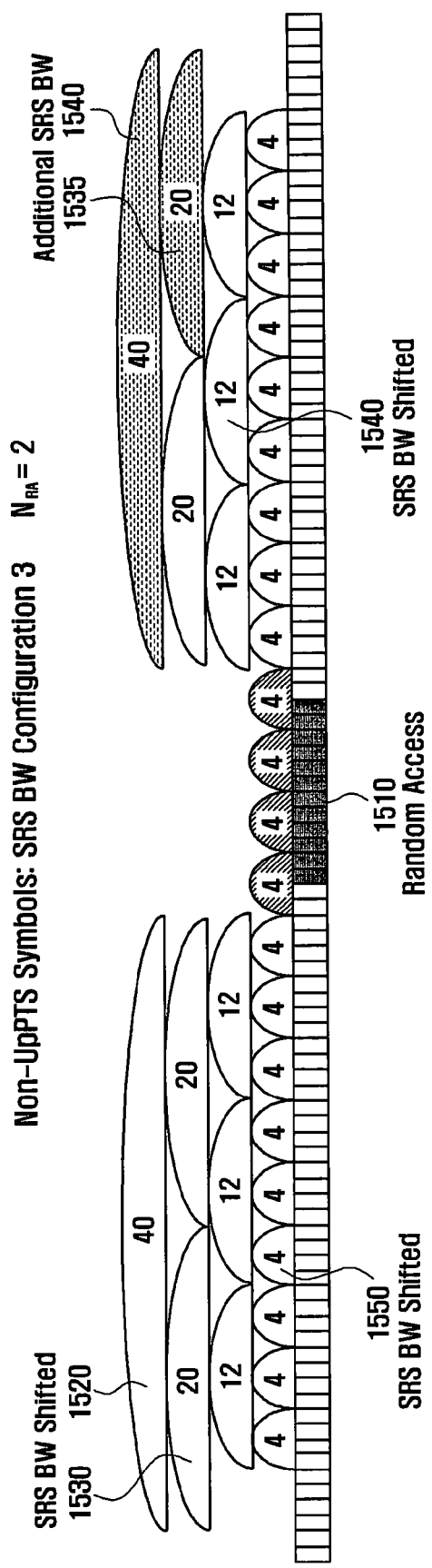
FIG. 15 is a diagram illustrating a second adjustment of intermediate SRS transmission bandwidths to avoid overlapping with the transmission bandwidth of random access channels located in the interior of the operating bandwidth in a UpPTS symbol, according to an embodiment of the present invention.

A second approach is to adjust the SRS transmission BWs to avoid any overlapping with the BW allocated to random access channels. This is illustrated in FIG. 15, according to an embodiment of the present invention. BW allocated to random access channels 1510 is placed near the middle of the operating BW but any other location may apply. SRS transmission with the maximum BW 1520 is shifted and reduced to the maximum BW supportable in non-UpPTS symbols that does not overlap with the BW allocated to the random access channels. Although only one maximum SRS BW exists in non-UpPTS symbols, a second one 1525 may be used in the UpPTS symbol which may be for example allocated to UEs having a respective SRS transmission only during the UpPTS symbol. The same process applies for the remaining SRS transmission BWs 1530, 1540, and 1550. Also, as with the maximum SRS BW, additional SRS transmission BWs may be generated for other SRS transmission BWs as in 1535.

In an embodiment of the present invention, prior to reconfiguration of the SRS BW configuration at the UE, the Node B allocates the BW for the transmission of the random access channels via a sub-carrier mapper, and transmits the allocated bandwidth and an SRS BW configuration to the UE via a transmitter. Upon reconfiguration of the SRS BW configuration, an SRS may be transmitted to the Node B from the UE. The Node B receives SRS transmissions in accordance with bandwidths from the reconfigured SRS bandwidth configuration that prevents overlap with the bandwidth allocated to the transmission of the one or more random access channels.

While the present invention has been shown and described with reference to certain embodiments thereof, it will be understood by those skilled in the art that various changes in form and detail may be made therein without departing from the spirit and scope of the present invention as defined by the appended claims.

What is claimed is:

1. A method for a User Equipment (UE) to transmit a Sounding Reference Signal (SRS) to a network in a communication system, the method comprising steps of:

identifying a plurality of SRS bandwidth configurations for a given operating bandwidth, wherein each SRS bandwidth configuration comprises a plurality of SRS bandwidths;

receiving a cell-specific parameter and a UE-specific parameter, wherein the cell-specific parameter is indicative of an SRS bandwidth configuration of the plurality of SRS bandwidth configurations, and the UE-specific parameter is indicative of an SRS bandwidth of the plurality of SRS bandwidths, where a pair of the cell-specific parameter and the UE-specific parameter corresponds to a SRS bandwidth;

reconfiguring the SRS bandwidth to a maximum SRS bandwidth that is less than or equal to a value determined by a function of a number of random access channels and a constant in case of Uplink ParT symbol (UpPTS), wherein the maximum SRS bandwidth is associated with one of the plurality of SRS bandwidth configurations; and transmitting the SRS based on the reconfigured SRS bandwidth, wherein the maximum SRS bandwidth is one of a plurality of SRS bandwidths, and the plurality of SRS bandwidths correspond to a UE-specific parameter having a lowest index.

2. The method of claim 1, wherein the random access channels are located at each edge of an operating bandwidth.

3. The method of claim 2, wherein at least one resource block at each edge of the operating bandwidth remains unsounded.

4. The method of claim 1, wherein the maximum SRS bandwidth bandwidth is a maximum of bandwidth values in the set of SRS bandwidth configurations that avoids overlapping with the bandwidth allocated to transmissions of the random access channels.

5. The method of claim 4, wherein the maximum SRS bandwidth is denoted by $N_{max}^{SRS}$ and determined, in terms of resource blocks, as $$N_{max}^{SRS} = \max_{c \in C} \{m_{SRS,0}^c\} \leq (N_{RB}^{UL} - Q \cdot N_{RA}),$$

where
$N_{RB}^{UL}$ is an uplink bandwidth in terms of resource blocks,
C is the set of SRS configurations,
c is an SRS configuration in the set C of SRS configurations,
$m_{SRS,0}^c$ is a maximum bandwidth value for SRS configuration c; and
$N_{RA}$ is a number of random access channels and Q is a number of resource blocks for each random access channel.

6. The method of claim 5, wherein a value of Q is 6.

7. The method of claim 1, wherein both SRS transmission and random access channel transmission occur in Uplink ParT Symbols (UpPTS) of a special sub-frame.

8. The method of claim 1, further comprising suspending at least one SRS transmission, when a bandwidth of the at least one SRS transmission overlaps the bandwidth allocated to the transmission of the random access channels.

9. The method of claim 1, further comprising:
when a bandwidth of a SRS transmission partially overlaps the bandwidth allocated to the transmission of the one or more random access channels, reducing the bandwidth of the SRS transmission to a maximum bandwidth that does not overlap the bandwidth allocated to the transmission of the random access channels; and
when the bandwidth of the SRS transmission fully overlaps the bandwidth allocated to the transmission of the random access channels, suspending the SRS transmission.

10. The method of claim 1, further comprising:
when a bandwidth of a SRS transmission partially overlaps the bandwidth allocated to the transmission of the random access channels, reducing a bandwidth of all SRS transmissions in a corresponding bandwidth so that the SRS transmission does not overlap the bandwidth allocated to the transmission of the random access channels; and
when the bandwidth of the SRS transmission fully overlaps the bandwidth allocated to the transmission of the random access channels, suspending the SRS transmission.

11. The method of claim 1, wherein the random access channels are located in an interior of an operating bandwidth.

12. The method of claim 11, wherein a maximum bandwidth SRS transmission and non-maximum bandwidth SRS transmissions are suspended when they overlap the bandwidth allocated to the random access channels.

13. The method of claim 11, wherein, when a maximum bandwidth SRS transmission and non-maximum bandwidth SRS transmissions overlap the bandwidth allocated to the random access channels, the maximum bandwidth SRS transmission and the non-maximum bandwidth SRS transmission are shifted to an area of the operating bandwidth that does not overlap the bandwidth allocated to the random access channels.

14. The method of claim 13, wherein an additional maximum bandwidth SRS transmission and additional non-maximum bandwidth SRS transmissions may be generated on the operating bandwidth.

15. A method for a network to receive a Sounding Reference Signal (SRS) from a User Equipment (UE) in a communication system, comprising steps of:
identifying a plurality of SRS bandwidth configurations for a given operating bandwidth, wherein each SRS bandwidth configuration comprises a plurality of SRS bandwidths;
transmitting, to the UE, a cell-specific parameter and a UE-specific parameter, wherein the cell-specific parameter is indicative of an SRS bandwidth configuration of the plurality of SRS bandwidth configurations, and the UE-specific parameter is indicative of an SRS bandwidth of the plurality of SRS bandwidths of the SRS bandwidth configuration; and
receiving and processing an SRS transmission based on a bandwidth from a reconfigured SRS bandwidth configuration, which was reconfigured by the UE,
wherein the SRS bandwidth is reconfigured to a maximum SRS bandwidth that is equal to or less than a value determined by a function of a number of random access channels and a constant in case of Uplink ParT symbol (UpPTS), where the maximum SRS bandwidth is associated with one of the plurality of SRS bandwidth configurations, and
wherein the maximum SRS bandwidth is one of a plurality of SRS bandwidths, and the plurality of SRS bandwidths correspond to a UE-specific parameter having a lowest index.

16. The method of claim 15, wherein the network informs the UE of representative of a SRS transmission bandwidth.

17. The method of claim 15, wherein the maximum SRS bandwidth is a maximum of bandwidth values in the set of SRS bandwidth configurations that avoids overlapping with the bandwidth allocated to transmissions of the random access channels.

18. The method of claim 17, wherein the maximum SRS bandwidth is denoted by $N_{max}^{SRS}$ and determined, in terms of resource blocks, as $$N_{max}^{SRS} = \max_{c \in C} \{m_{SRS,0}^c\} \leq (N_{RB}^{UL} - Q \cdot N_{RA}),$$

where
$N_{RB}^{UL}$ is an uplink bandwidth in terms of resource blocks,
C is the set of SRS configurations,
c is an SRS configuration in the set C of SRS configurations,
$m_{SRS,0}^c$ is a maximum bandwidth value for SRS configuration c; and
$N_{RA}$ is a number of random access channels and Q is a number of resource blocks for each random access channel.

19. The method of claim 18, wherein a value of Q is 6.

20. The method of claim 15, wherein both SRS transmission and random access channel transmission occur in Uplink ParT Symbols (UpPTS) of a special sub-frame.

21. A User Equipment (UE) for transmitting a Sounding Reference Signal (SRS) to a network in a communication system, the UE comprising:
   a transceiver for transmitting and receiving a signal; and
   a sub-carrier mapper
      for identifying a plurality of SRS bandwidth configurations for a given operating bandwidth, wherein each SRS bandwidth configuration comprises a plurality of SRS bandwidths,
      for receiving a cell-specific parameter and a UE-specific parameter, wherein the cell-specific parameter is indicative of an SRS bandwidth configuration of the plurality of SRS bandwidth configurations, and the UE-specific parameter is indicative of an SRS bandwidth of the plurality of SRS bandwidths, where a pair of the cell-specific parameter and the UE-specific parameter corresponds to a SRS bandwidth,
      for reconfiguring the SRS bandwidth to a maximum SRS bandwidth that is equal to or less than a value determined by a function of a number of random access channels and a constant in case of Uplink ParT symbol (UpPTS), where the maximum SRS bandwidth is associated with one of the plurality of SRS bandwidth configurations, and
      for transmitting the SRS based on the reconfigured SRS bandwidth, wherein the maximum SRS bandwidth is one of a plurality of SRS bandwidths, and the plurality of SRS bandwidths correspond to a UE-specific parameter having a lowest index.

22. The UE of claim 21, wherein the maximum SRS bandwidth is a maximum of bandwidth values in a set of SRS bandwidth configurations that avoids overlapping with the bandwidth allocated to transmissions of the random access channels.

23. The UE of claim 22, wherein the maximum SRS bandwidth is denoted by $N_{max}^{SRS}$ and determined, in terms of resource blocks, as $$N_{max}^{SRS} = \max_{c \in C}\{m_{SRS,0}^c\} \leq (N_{RB}^{UL} - Q \cdot N_{RA}),$$

where
$N_{RB}^{UL}$ is an uplink bandwidth in terms of resource blocks,
C is the set of SRS configurations,
c is an SRS configuration in the set C of SRS configurations,
$m_{SRS,0}^c$ is a maximum bandwidth value for SRS configuration c; and
$N_{RA}$ is a number of random access channels and Q is a number of resource blocks for each random access channel.

24. The UE of claim 23, wherein a value of Q is 6.

25. The UE of claim 21, wherein both SRS transmission and random access channel transmission occur in Uplink ParT Symbols (UpPTS) of a special sub-frame.

26. A network for receiving a Sounding Reference Signal (SRS) from a User Equipment (UE) in a communication system, the network comprising:
   a sub-carrier mapper for identifying a plurality of SRS bandwidth configurations for a given operating bandwidth, wherein each SRS bandwidth configuration comprises a plurality of SRS bandwidths;
   a transmitter for transmitting, to the UE, a cell-specific parameter and a UE-specific parameter, wherein the cell-specific parameter is indicative of an SRS bandwidth configuration of the plurality of SRS bandwidth configurations, and the UE-specific parameter is indicative of an SRS bandwidth of the plurality of SRS bandwidths of the SRS bandwidth configuration; and
   a receiver for receiving and processing an SRS transmission based on a bandwidth from a reconfigured SRS bandwidth configuration, which was reconfigured by the UE,
   wherein the SRS bandwidth is reconfigured to a maximum SRS bandwidth that is equal to or less than a value determined by a function of a number of random access channels and a constant in case of Uplink ParT symbol (UpPTS), where the maximum SRS bandwidth is associated with one of the plurality of SRS bandwidth configurations, and
   wherein the maximum SRS bandwidth is one of a plurality of SRS bandwidths, and the plurality of SRS bandwidths correspond to a UE-specific parameter having a lowest index.

27. The network of claim 26, wherein the network informs the UE of representative of an SRS transmission bandwidth.

28. The network of claim 26, wherein maximum SRS bandwidth is a maximum of bandwidth values in the set of SRS bandwidth configurations that avoids overlapping with the bandwidth allocated to transmissions of the random access channels.

29. The network of claim 28, wherein the maximum SRS bandwidth is denoted by $N_{max}^{SRS}$ and determined, in terms of resource blocks, as $$N_{max}^{SRS} = \max_{c \in C}\{m_{SRS,0}^c\} \leq (N_{RB}^{UL} - Q \cdot N_{RA}),$$

where
$N_{RB}^{UL}$ is an uplink bandwidth in terms of resource blocks,
C is the set of SRS configurations,
c is an SRS configuration in the set C of SRS configurations,
$m_{SRS,0}^c$ is a maximum bandwidth value for SRS configuration c; and
$N_{RA}$ is a number of random access channels and Q is a number of resource blocks for each random access channel.

30. The network of claim 29, wherein a value of Q is 6.

31. The network of claim 26, wherein both SRS transmission and random access channel transmission occur in Uplink ParT Symbols (UpPTS) of a special sub-frame.

* * * * *